United States Patent [19]

Nakaji et al.

[11] Patent Number: 5,238,695
[45] Date of Patent: Aug. 24, 1993

[54] DYEING AGENT, DYEING SOLUTION AND METHOD FOR DYEING STRAWBERRY

[75] Inventors: Kazuo Nakaji, Fujiidera; Yoshio Sawada, Fukushima; Tetsuya Sagoh, Nara, all of Japan

[73] Assignee: House Food Industrial Co., Ltd., Higashi-Osaka, Japan

[21] Appl. No.: 745,183

[22] Filed: Aug. 15, 1991

[30] Foreign Application Priority Data

Aug. 16, 1990 [JP] Japan .................. 2-216768

[51] Int. Cl.⁵ .............................. A23L 1/275
[52] U.S. Cl. ........................ 426/540; 426/250
[58] Field of Search ................. 424/540, 250

[56] References Cited

U.S. PATENT DOCUMENTS

| | | | |
|---|---|---|---|
| 3,192,055 | 6/1965 | Beerend et al. | 426/250 |
| 4,333,957 | 6/1982 | Okajima et al. | 426/540 |
| 4,414,234 | 11/1983 | Screennasan et al. | 426/540 |

FOREIGN PATENT DOCUMENTS

| | | | |
|---|---|---|---|
| 48-10546 | 4/1973 | Japan | 426/540 |
| 51-37336 | 10/1976 | Japan | 426/540 |
| 124649 | 10/1978 | Japan | 426/250 |
| 57-49584 | 10/1982 | Japan | 426/540 |
| 220651 | 12/1983 | Japan . | |
| 291242 | 12/1990 | Japan . | |

*Primary Examiner*—Joseph Golian
*Attorney, Agent, or Firm*—Oblon, Spivak, McClelland, Maier & Neustadt

[57] ABSTRACT

A dyeing agent for dyeing strawberries comprises (a-1) a lac dye; (b) alum; (c) L-ascorbic acid and/or a salt thereof; and (d) a phosphoric acid salt in a weight ratio in an amount of 0.8~6.0 parts by weight of component (b), 1.0~10.0 parts by weight of component (c) and 2.5~23.3 parts by weight of component (d) relative to 1 part by weight of component (a-1), or (a-2) a cochineal dye and a lac dye; (b); (c) and (d) in an amount of 0.8~3.6 parts by weight of component (b), 1.0~6.0 parts by weight of component (c) and 2.5~14 parts by weight of component (d) relative to 1 part by weight of component (a-2). A method for dyeing strawberries comprises the steps of removing the cuticula layer of unripe strawberries, charging the strawberries in a container together with a dyeing solution containing the dyeing agent, degassing the contents of the container, then sealing the container and heating the sealed container. Thereby, it is possible to uniformly dye strawberries approximately natural color of ripe fruits. Thus, strawberries can be dyed in high efficiency through simple processes, i.e., without using a multistage immersion treatment. Moreover, there can be obtained strawberries whose texture is not softened, which are hard and tight and which exhibit favorable taste peculiar to strawberries.

14 Claims, No Drawings

DYEING AGENT, DYEING SOLUTION AND METHOD FOR DYEING STRAWBERRY

BACKGROUND OF THE INVENTION

The present invention relates to a strawberry-dyeing agent and a dyeing solution for use in preparing strawberry dyed which have widely been used as, for instance, additives for confectionery such as cakes and jellies as well as a method for dyeing strawberries with the dyeing solution.

Strawberries have poor storability as compared with other fruits, ripen fast after harvesting and the shelf-life at ordinary temperature is only 2 days. Moreover, natural dyestuffs of the strawberry are thermally unstable and severely lose the color. When storing the strawberry having such a short shelf-life after harvesting, cooler-storage has usually been adopted. For instance, there has been adopted a method comprising the steps of mixing strawberries with liquid sugar or solid sugar, immediately cooling the mixture down to $-30°$ C. or lower and then storing it at a temperature of not more than $-20°$ C.

However, the color fading already discussed above also proceeds in the cooler-stored strawberry, the appearance thereof becomes substantially inferior to that for those just harvested and further the texture and the shape retention become brittle and poor, respectively.

In addition, there has been a method for dyeing a variety of fruits with dyes to prevent the color fading of the dyestuffs thereof. For instance, Lecture II "Manufacture of Canned Foods", pp. 291-294, issued on September first, Showa 44 (1969), by Canners Association of Japan discloses a method for preparing cherries preserved in syrup which comprises dyeing cherries by immersing them in a dyeing solution comprising an artificial dye and an organic acid for adjusting pH thereof to 4.5 contained in a tub or tank, rapidly cooling them, then sufficiently washing with water, canning them together with syrup, degassing the contents of the can, i.e., the cherries and the syrup, sealing the can and sterilizing the contents of the sealed can.

However, such a dyeing method requires the use of a multistage immersion process and a water washing process and, thus the practice of this method is quite troublesome. Moreover, if fruits having a high air content are treated by this method, oxidation and browning of the fruits are accelerated during the storage. Further, it would take several days for dyeing the fruits if a natural dye is substituted for an artificial dye.

SUMMARY OF THE INVENTION

Accordingly, an object of the present invention is to provide a dyeing agent and a dyeing solution which make it possible to uniformly dye strawberries a color which is approximately identical to that of the natural strawberry fruit.

Another object of the present invention is to provide a method for dyeing strawberries in which the foregoing dyeing solution is employed and which makes it possible to dye strawberries in high efficiency through a simple process, in other words without using any multistage immersion treatment.

A further object of the present invention is to provide a method for dyeing strawberries in which the strawberries can satisfactorily be dyed with a natural dye within a short time period and which makes it possible to effectively prevent the deterioration of the strawberry fruits during storage.

Other objects and features of the present invention will become apparent from the following description and Examples.

The present invention has been completed on the basis of the finding that the foregoing objects of the invention can effectively be achieved by the use of one or two specific red dyes, alum, L-ascorbic acid and/or a salt thereof and a salt of phosphoric acid in specific amounts.

According to first aspect of the present invention, there is provided a dyeing agent for strawberries which comprises (a-1) a lac dye; (b) alum; (c) L-ascorbic acid and/or a salt thereof; and (d) a phosphoric acid salt in an amount of 0.8~6.0 parts by weight of component (b), 1.0~10.0 parts by weight of component (c) and 2.5~23.3 parts by weight of component (d) relative to 1 part by weight of component (a-1).

According to second aspect of the present invention, there is provided a dyeing agent for strawberries which comprises (a-2) a cochineal dye and a lac dye; (b) alum; (c) L-ascorbic acid and/or a salt thereof; and (d) a phosphoric acid salt in an amount of 0.8~3.6 parts by weight of component (b), 1.0~6.0 parts by weight of component (c) and 2.5~14 parts by weight of component (d) relative to 1 part by weight of component (a-2).

According to another aspect of the present invention, there is provided a dyeing solution for dyeing strawberries which comprises the foregoing components (a-1) to (d) or (a-2) to (d).

According to a further aspect of the present invention, there is provided a method for dyeing strawberries a color identical with the natural one with the foregoing dyeing solution.

DESCRIPTION OF THE PREFERRED EMBODIMENTS

The present invention will hereinafter be described in more detail.

The strawberry-dyeing agent of the present invention may be a simple mixture of the foregoing components (a-1) to (d) or (a-2) to (d) or may be formed into a variety of preparations in any method.

In the present invention, the lac dye is singly used as the component (a-1) of the dyeing agent defined above or is used together with the cochineal dye as the component (a-2). As the cochineal dyes herein usable, there are preferably used those having a color index, as determined according to the following color index-determining method, ranging from 480 to 500.

Color Index-Determining Method for Cochineal Dyes

A cochineal dye is accurately weighed out so that the absorbance to be determined falls within the range of from 0.2 to 0.7, a 0.1N hydrochloric acid solution is added thereto to give 100 ml of a solution, the resulting solution is, if necessary, subjected to centrifugation, 1 ml thereof is taken and then a 0.1N hydrochloric acid is added to give 100 ml of a sample solution to be tested. Using a 0.1N hydrochloric acid solution as a control, the absorbance A of the sample solution contained in a cell having a thickness of 1 cm is determined at a wavelength of about 495 nm at which the dye shows its maximum absorption and the color index is thus determined according to the following equation:

Color Index = (A × 100)/(the amount (g) of the sample used)

In addition, as the lac dyes, there can be used, for instance, those having a color index, as determined according to the following method, ranging from 1490 to 1570.

Color Index-Determining Method for Lac Dyes

The same procedures used in the determination of the color index for cochineal dyes can be used except that a lac dye is dissolved in 20 ml of a 0.1N $Na_2CO_3$ solution and then diluted with water to 100 ml instead of diluting with a 0.1N hydrochloric acid solution to 100 ml. The color index can likewise be obtained according to the same equation defined above.

In the present invention, the lac dye can be used singly in the dyeing agent or can be used together with the cochineal dye in the dyeing agent, but it is preferable to use the combination of the lac dye and the cochineal dye since the uniformity of the dyeing can be further ensured. In case of use of the combination of the lac dye and the cochineal dye, the amounts of the cochineal dye and the lac dye are not restricted to specific ones, but preferably they are simultaneously used in a weight ratio, cochineal dye/lac dye, ranging from 1/0.16 to 1/1.33, more preferably 1/0.33 to 1/1 or in a ratio of the color index of the cochineal dye to that of the lac dye ranging from 1/0.5 to 1/4, more preferably 1/1 to 1/3.

As the component (b), i.e., alum, there may be used, for instance, potassium alum, ammonium alum or burnt alum. Alums are used in the present invention for the purpose of making the red color tone of the resulting dyed strawberries more favorable. If alum is not used, the strawberries cannot be dyed with the dyeing solution.

The component (c), i.e., L-ascorbic acid and/or the salt thereof ensure an effect of making the color of the dyed strawberries bright red. Examples of the salts of L-ascorbic acid usable in the present invention are a variety of salts thereof such as sodium salt and potassium salt, with sodium salt being particularly preferred.

The component (d), i.e., the phosphoric acid salt, is used in the dyeing agent of the present invention for improving the dyeing affinity of the dye to the strawberries to be dyed and for making the red color tone of the dyed strawberries more favorable. Examples of the salts include various salts of phosphoric acid such as sodium salt, calcium salt and the like.

In the dyeing agent of the present invention, the foregoing components (a 1) to (d) are used in an amount of 0.8~6.0 parts by weight of component (b), 1.0~10.0 parts by weight of component (c) and 2.5~23.3 parts by weight of component (d), preferably 0.8~2.3 parts by weight of component (b), 1.8~8.7 parts by weight of component (c) and 2.5~21.7 parts by weight of component (d) relative to 1 part by weight of component (a-1), while the foregoing components (a-2) to (d) are used in an amount of 0.8~3.6 parts by weight of component (b), 1.0~6.0 parts by weight of component (c) and 2.5~14 parts by weight of component (d), preferably 0.8~1.4 parts by weight of component (b), 1.8~5.2 parts by weight of component (c) and 2.5~13 parts by weight of component (d) relative to 1 part by weight of component (a-2).

The dyeing agent may further comprise dyes other than those defined above depending on the kinds of the strawberries to be treated. Examples of the kinds of strawberries are "Joho" and "Reiko" having deep-red color and "Toyonoka" having orenge-red. When strawberries are to be dyed the color of "Toyonoka", yellow dyes of gardenia and/or safflower (hereinafter referred to as component (e)) are added to the dyeing agent. In this case, these components are used in an amount of 0.8 to 6.0 parts by weight of component (b), 1.0 to 10.0 parts by weight of component (c), 2.5 to 23.3 parts by weight of component (d), 3 to 16.7 parts by weight of component (e), preferably 0.8 to 2.3 parts by weight of component (b), 1.8 to 8.7 parts by weight of component (c), 2.5 to 21.7 parts by weight of component (d), 8 to 10 parts by weight of component (e) relative to 1 part by weight of component (a-1), while the foregoing components (a-2) to (e) are used in an amount of 0.8 to 3.6 parts by weight of component (b), 1.0 to 6.0 parts by weight of component (c), 2.5 to 14 parts by weight of component (d), 3 to 16.7 parts by weight of component (e), preferably 0.8 to 1.4 parts by weight of component (b), 1.8 to 5.2 parts by weight of component (c), 7 to 13 parts by weight of component (d) and 8 to 10 parts by weight of component (e) relative to 1 part by weight of component (a-2).

Preferred yellow dyes of gardenia are those having a color index ranging from 830 to 870 as determined by the foregoing method except that light rays of 440 nm are used. On the other hand, preferred yellow dyes of safflower are those having a color index ranging from 830 to 870 as determined by the aforementioned method except that light rays of 400 nm are used for the determination.

The dyeing agent of the present invention may optionally comprise a variety of other components in addition to the aforementioned dyes. For instance, a calcium ion-releasing compound such as a calcium salt is added thereto for the purpose of preventing the softening of the strawberries caused during heating, of maintaining appropriate hardness thereof and of effectively maintaining the red color after dyeing. In addition, other additives such as acidulants, e.g., tartaric acid, citric acid and malic acid; sugar and flavors can likewise be added, in proper amounts, to impart desired taste and perfume to the resulting dyed strawberries.

The dyeing solution of the present invention can be prepared in the form of an aqueous solution by, for instance, diluting the foregoing dyeing agent with water to obtain an aqueous solution containing 0.03 to 0.08% by weight (hereinafter referred to as simply "%") of the component (a-1) or (a-2); 0.064 to 0.18% of the component (b); 0.08 to 0.3% of the component (c); and 0.20 to 0.7% of the component (d) and then heating the resulting solution at a temperature ranging from 85° to 95 °C. In this case, the dye components such as the lac dye and cochineal dye are heated in the coexistence of alum to thus form a dye lake capable of dyeing the strawberries. Other diluents such as a solution of sucrose may also be used instead of water.

When component (a-2) is used in the foregoing method for the preparation of dyeing solutions, it is preferable that the amount of the component (a-2) be adjusted so that the resulting dyeing solution comprises 0.013 to 0.069% of the cochineal dye and 0.004 to 0.046% of the lac dye. Moreover, the resulting dyeing solution preferably comprises 0.20 to 0.25% of, in particular, trisodium phosphate. Further, the dyeing solution may comprise the optional component (e) in an amount ranging from 0.04 to 0.50%.

Further, the dyeing solution may likewise comprise up to 0.012% (expressed in the amount of Ca) of a calcium ion-releasing compound.

In the present invention, the strawberries may be dyed with the foregoing dyeing agent or dyeing solution in any manner, but it is desirable to previously remove the cuticula layer present on the surface of the strawberries by dissolving out the same with a hot alkaline solution prior to the dyeing procedures. This treatment makes it possible to uniformly dye the strawberries and to substantially improve the dyeing effect of the invention. Moreover, the treatment with an alkali can further enhance the degree of dyeing of the strawberries by the lac and/or cochineal dyes present in the dyeing solution.

The removal of the cuticula layer from the surface of the strawberries can be carried out by immersing the strawberries in an aqueous solution of sodium hydroxide having a concentration ranging from 1 to 6%, preferably 2 to 4% at a temperature ranging from 80° to 90° C. or by spraying the aqueous solution onto the surface of the strawberries using a showering apparatus. The alkali treatment performed under the foregoing specific conditions makes it possible to effectively prevent the removal of seeds of the strawberries simultaneously with the cuticula layer.

The dyeing method of the present invention preferably comprises introducing the strawberries whose cuticula layer has been removed into a container together with the dyeing solution, degassing the content of the container, then sealing the container and heating the sealed container. In other words, in this method, the use of the conventional multi-stage process is not necessary and it is not necessary to preliminarily immerse strawberries in a dyeing solution as in the conventional methods. Thus, the method allows the dyeing of strawberries in high production efficiency through a simple process.

The amount of the dyeing solution to be introduced into a container is selected such that the strawberries to be dyed are completely immersed in the solution and more specifically it is selected so that the weight ratio of strawberries to be treated to the dyeing solution is, for instance, about 8:5.

The strawberries to be treated are preferably those which are still unripe. This is because, if ripened fruits are treated, they are excessively softened through heating and hence cannot maintain the desired shape thereof. The term "unripe" herein means that the fruits have a hardness corresponding to not less than 100 g of the force required for cutting them with a blade at a velocity of 2 cm/min using Rheometer NRM-2010J-Cw Type available from Fudow Co., Ltd.

The dyeing solution preferably has a pH value which is lowered to the range of 3 to 5, in particular 3.6 to 4.2 upon heating during the practice of the dyeing method as will be explained below. Where the pH of the dyeing solution after heating is lower than the lower limit, dyeing the strawberry can be effected, but fading of the strawberry occurs during the storage. On the other hand, where the pH of the dyeing solution after heating is higher than the upper limit, there is a trend of lowering the sterilization effect.

The pH of the dyeing solution before heating depends on the acidity of the strawberry and it may be sufficient to adjust the pH of the dyeing solution after heating within the pH range mentioned above. In this respect, if the pH of the dyeing solution before heating is in the range of 4 to 9, the pH of the solution after heating would fall within the pH range mentioned above.

When the dyeing solution is charged into a container, the components (a-1), (b), (c) and (d) or (a-2), (b), (c) and (d) may be mixed together in advance to prepare the dyeing solution and then charged in the container, alternatively one or several kinds of the components may be separately charged in the container. In the latter case, it is practically preferable that the lac dye of component (a-1) or the lac dye and the cochineal dye of component (a-2), and alum be separately charged in a container. That is, the dyeing solution is prepared by mixing the aforementioned components and heating the resultant mixture to 85° to 95° C., in particular, the lac dye of component (a-1) or the lac dye and the cochineal dye of component (a-2), and alum are heated to form dye lake having strong coloring ability. Since the dye lake is easy to precipitate within the pH range of 3 to 5, in particular, 3.6 to 4.2, when the dyeing solution containing such a dye lake is stored in a stored tunk and the like for a long time, lots of precipitates are formed and the thus formed precipitates adhere to strawberry, so that the strawberry may not be dyed in good color. Such trouble can be solved by charging the components (a-1) or (a-2) and (b) in a container separately.

The containers usable in the method of the present invention are not restricted to specific ones so long as they are heat resistant, water-resistant and air-tightly sealable and examples thereof are cans, pouches of synthetic resins and bottles. For instance, inside-coated can and tin-free steel can are preferable in view of corrosion resistance and less fading during storage.

In the foregoing method, the contents (i.e., the dyeing solution and strawberries to be treated) of the container are degassed after the introduction thereof. This degassing treatment is performed for preventing the oxidation and browning of the strawberries due to the remaining air (inclusive of the air remaining in the fruit) during heating and storage.

The degassing process can be performed by, for instance, degassing methods through displacement such as a method comprising blowing a gas or steam through the contents of the container, vacuum degassing methods and degassing methods by heating (these methods are particularly effective for degassing the same when the volume of the container is not less than about 3 l). The degassing methods by heating are preferably carried out at a temperature ranging from 90° to 100° C. for 7 to 30 minutes. This is because if the treatment is carried out at a temperature lower than the lower limit for a time shorter than the lower limit, the degassing is insufficient, while if the temperature is higher than the upper limit and the time exceeds the upper limit, the strawberries to be treated is not often uniformly heated since the heating is performed at a stationary state.

In the foregoing method, the container is sealed after the degassing and then heated. When the degassing is carried out by heating, the heating after the degassing is preferably performed at a temperature ranging from 85° to 99° C. for 15 to 60 minutes. If these heating conditions are lower than the corresponding lower limits respectively, the strawberries are dyed insufficiently, while if the heating is performed at conditions which exceed the corresponding upper limits respectively, the taste of the strawberries treated is certainly impaired due to the superheating and the texture thereof is likewise excessively softened.

On the other hand, when the degassing is carried out by the methods other than the degassing through heating, the heating after the degassing is preferably performed at a temperature ranging from 80° to 95° C. for 20 to 120 minutes. For instance, the heating is carried out at 80° C. for about 60 to 120 minutes or at 95° C. for about 20 to 60 minutes.

Alternatively, the method of the present invention comprises removing the cuticula layer from the strawberries to be treated, introducing the strawberries into a container together with the dyeing solution defined above and then applying a reduced pressure to the container. This method makes it possible to sufficiently dye the strawberries within a short period of time, to sufficiently exhaust the air from the strawberries having a high air content in the container and to thus effectively prevent the oxidation and browning of the strawberries during the storage. Further, if a dyeing solution containing sugar is used, the sugar can also be penetrated into the strawberries in addition to the dyeing solution within a short time period and, therefore, the contraction of the strawberries which is observed for the penetration of sugar over a long time period can effectively be prevented. If the strawberries are stored after the dyeing treatment, there may be used, for instance, a method comprising degassing the container which contains the strawberries and the dyeing solution, sealing the container and then sterilizing the contents 0f the container by heating; or a method comprising removing the dyed strawberries from the dyeing solution, introducing the strawberries and a solution other than the dyeing solution such as sugar solution into a container, followed by degassing, sealing and sterilization by heating. The container, degassing process and conditions for the sterilization by heating are the same as those defined above in connection with the aforementioned dyeing method. Moreover, if the foregoing storage through sterilization by heating is adopted or through application of a reduced pressure under severe conditions, strawberries which are still unripe are preferably used as already discussed above.

The foregoing dyeing by the treatment through pressure reduction is preferably carried out at a pressure reduction ranging from 50 to 76 cmHg for 10 to 120 minutes. This is because if the treatment is performed at a pressure reduction of less than 50 cmHg, the air in the strawberries cannot sufficiently be removed and hence the air still remains in the strawberries, which results in the oxidation and browning of the strawberries during the storage. In this connection, if the pressure reduction is rapidly performed in this treatment, there is a risk of causing deformation of the shape of strawberries and thus, the pressure is desirably slowly reduced to a desired level. In addition, the pressure reduction treatment can be performed under heating at a temperature ranging from 30° to 50 ° C. for ensuring the effective removal of the air.

Upon performing the foregoing treatment comprising the application of a reduced pressure, the conditions for the treatment such as the ratio of the strawberries to be treated to the dyeing solution, pH of the dyeing solution and the composition of the dyeing solution are the same as those defined above in connection with the foregoing dyeing method.

According to the present invention, there are provided a dyeing agent and a dyeing solution as well as a method for uniformly dyeing strawberries red approximately identical with that of the ripened natural fruit. Moreover, if the strawberries are dyed with the dyeing solution after removing the cuticula layer from the fruits, the strawberries can uniformly be dyed and the dyeing ability of the solution is substantially improved. Further, if the dyeing treatment is carried out simultaneously with the sterilization treatment, strawberries can be dyed in high efficiency through simple processes, i.e., without using a multistage immersion treatment. Moreover, the dyeing treatment comprising the application of a reduced pressure makes it possible to sufficiently dye the strawberries within a short period of time and to effectively prevent the deterioration of the fruits during the storage. In addition, in the present invention, unripe strawberry fruits are used and, therefore, the present invention can provide strawberries whose texture is not softened, which correspondingly do not cause any deformation of shape, which are sufficiently hard and tight and which exhibit favorable taste of strawberries.

The present invention will hereinafter be explained in more detail with reference to the following working Examples and Comparative Examples.

EXAMPLE 1

An amount of 2 kg of unripe strawberry fruits was immersed in 20 kg of a 4% aqueous solution of sodium hydroxide at 90° C. for 20 seconds, removed from the solution and washed with water to give the strawberries from which the cuticula layer was removed.

An amount of 1.8 kg of the strawberries thus treated was charged in a lacquer-finished can together with 1.2 kg of each dyeing solution having each corresponding composition as shown in the following Table-1 then the contents of the container was degassed by heating to 90° C. for 10 minutes, thereafter the container was sealed and sterilized by heating it to 85° C. for 40 minutes to thus complete each dyeing treatment.

In the following Table-1, the numerical value represents "% by weight" and the term "balance" means the amount of the sucrose solution required for making the sum of the amounts of the components 100%.

TABLE 1

| Component | Present Invention | | | Comparative Example | |
|---|---|---|---|---|---|
| | 1 | 2 | 3 | 4 | 5 |
| alkali treatment | O | O | O | X | O |
| cochineal dye | 0.04 | 0.04 | — | 0.04 | 0.04 |
| lac dye | 0.02 | 0.02 | 0.04 | 0.02 | 0.02 |
| yellow dye of gardenia | 0.04 | — | — | 0.04 | 0.04 |
| burnt alum | 0.10 | 0.10 | 0.10 | 0.10 | 0.10 |
| trisodium phosphate | 0.25 | 0.25 | 0.25 | 0.25 | — |
| ascorbic acid | 0.25 | 0.25 | 0.25 | 0.25 | 0.25 |
| calcium lactate | 0.10 | — | 0.10 | 0.10 | 0.10 |
| fruit juice | 5.0 | 5.0 | 5.0 | 5.0 | 5.0 |
| flavor | 0.20 | 0.20 | 0.20 | 0.20 | 0.20 |
| sucrose solution (Brix: 20) | balance | balance | balance | balance | balance |

The strawberries treated with the dyeing solution of the present invention (No. 1) were dyed orange-red which was quite identical with the color of the strawberry "Toyooka". Moreover, the strawberries treated with the dyeing solution Nos. 2 and 3 were dyed deep red identical with that of the strawberry "Joho".

On the contrary, the strawberries of Comparative Example No. 4 from which the cuticula layer had not removed was not dyed at all and remained white as the color of unripe fruits. Further, the strawberries treated with the dyeing solution No. 5 dyed dull and pale red.

In these experiments, unripe strawberries were used or dyed and therefore, there was not observed any softening of texture by heating and hence any deformation of the shape.

EXAMPLE 2

The strawberries from which the cuticula layer had been removed in the same manner used in Example 1 was immersed in the dyeing solution No. 3 used in Example 1 and then treated at a pressure reduction of 70 cmHg for 60 minutes to thus dye the strawberries and to exhaust the air from the strawberries.

Then 2.2 kg of the dyed strawberries were taken out of the dyeing solution, charged in a plain can together with 0.93 kg of syrup, followed by sealing through vacuum rolling and sterilization by heating at 85° C. for 40 minutes.

The syrup used herein comprises 0.5% of calcium lactate; 0.5% of citric acid; 0.3% of L-ascorbic acid; and the balance of sucroce solution (Brix 20).

The strawberries thus obtained maintain deep red color identical to that of "Joho" even after the storage, do not show deterioration of taste due to oxidation, browning and any deformation of the shape due to the softening of the texture.

What is claimed is:

1. A dyeing agent for dyeing strawberries comprising (a-1) a lac dye; (b) alum; (c) L-ascorbic acid and/or a salt thereof; and (d) a phosphoric acid salt in an amount of 0.8~6.0 parts by weight of component (b), 1.0~10.0 parts by weight of component (c) and 2.5~23.3 parts by weight of component (d) relative to 1 part by weight of component (a-1).

2. The dyeing agent of claim 1 wherein it further comprises yellow dyes derived from gardenia and/or safflower as a component (e) in a weight ratio, (a-1)/(e), of ⅓ to 16.7.

3. A dyeing agent for dyeing strawberries comprising (a-2) a combination of a lac dye and a cochineal dye; (b) alum; (c) L-ascorbic acid and/or a salt thereof; and (d) a phosphoric acid salt in an amount of 0.8~3.6 parts by weight of component (b), 1.0~6.0 parts by weight of component (c) and 2.5~14 parts by weight of component (d) relative to 1 part by weight of component (a-2).

4. The dyeing agent of claim 3 wherein the cochineal dye is selected from those having a color index ranging from 480 to 500.

5. The dyeing agent of claim 3 wherein the lac dye is selected from those having a color index ranging from 1490 to 1570.

6. The dyeing agent of claim 3 wherein the ratio of the cochineal dye to the lac dye ranges from 1:0.16 to 1:1.33 expressed in the weight ratio.

7. The dyeing agent of claim 3 wherein the ratio of the cochineal dye to the lac dye ranges from 1:0.5 to 1:4 expressed in the color index ratio.

8. The dyeing agent of claim 3 wherein the components (a-2) to (d) are in an amount of 0.8~1.4 parts by weight of component (b), 1.8~5.2 parts by weight of component (c) and 2.5~13 parts by weight of component (d) relative to 1 part by weight of component (a-2).

9. The dyeing agent of claim 3 wherein it further comprises yellow dyes derived from gardenia and/or safflower as a component (e) in a weight ratio, (a-2)/(e), of ⅓ to 16.7.

10. A dyeing solution comprising 0.03 to 0.08% by weight of (a-1) a lac dye or (a-2) a combination of a lac dye and a cochineal dye; (b) 0.064 to 0.18% by weight of alum; (c) 0.08 to 0.3% by weight of L-ascorbic acid and/or a salt thereof; and (d) 0.20 to 0.7% by weight of a phosphoric acid salt.

11. The dyeing solution of claim 10 wherein it comprises 0.013 to 0.069% of the cochineal dye and 0.004 to 0.046% of the lac dye.

12. The dyeing solution of claim 10 wherein it further comprises 0.40 to 0.50 % by weight of yellow dye derived from gardenia and/or safflower as a component (e).

13. The dyeing solution of claim 10 wherein it has a pH value ranging from 3 to 5 upon heating during the practice of the dyeing method.

14. The dying solution of claim 10 wherein the component (d) is trisodium phosphate and the amount thereof ranges from 0.20 to 0.25% by weight.

* * * * *